(12) United States Patent
Sedivy

(10) Patent No.: US 10,040,234 B2
(45) Date of Patent: Aug. 7, 2018

(54) MULTI-MANIFOLD EXTRUSION DIE WITH DECKLE SYSTEM AND METHOD OF USING SAME

(71) Applicant: Nordson Extrusion Dies Industries, LLC, Chippewa Falls, WI (US)

(72) Inventor: Jordan L. Sedivy, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 676 days.

(21) Appl. No.: 14/288,062

(22) Filed: May 27, 2014

(65) Prior Publication Data

US 2015/0343690 A1 Dec. 3, 2015

(51) Int. Cl.
| | | |
|---|---|---|
| *B29C 47/06* | (2006.01) | |
| *B29C 47/16* | (2006.01) | |
| *B29C 47/08* | (2006.01) | |
| *B29C 47/14* | (2006.01) | |
| *B29C 47/00* | (2006.01) | |

(52) U.S. Cl.
CPC ............ *B29C 47/16* (2013.01); *B29C 47/065* (2013.01); *B29C 47/0816* (2013.01); *B29C 47/145* (2013.01); *B29C 47/0019* (2013.01); *B29C 47/0021* (2013.01)

(58) Field of Classification Search
CPC . B29C 47/065; B29C 47/0816; B29C 47/145; B29C 47/16
See application file for complete search history.

(56) References Cited

U.S. PATENT DOCUMENTS

| | | | |
|---|---|---|---|
| 2,765,492 | A | 10/1956 | Velvel |
| 2,901,770 | A | 9/1959 | Beck |
| 2,998,624 | A | 9/1961 | Ricketts |
| 3,018,515 | A | 1/1962 | Sneddon |
| 3,039,143 | A | 6/1962 | Nicholson |
| 3,067,464 | A | 12/1962 | Nicholson |
| 3,163,693 | A | 12/1964 | Stenger et al. |
| 3,238,563 | A | 3/1966 | Hoffman |
| 3,293,689 | A | 12/1966 | Chiselko et al. |
| 3,611,491 | A | 10/1971 | Rector |
| 3,711,235 | A | 1/1973 | Bunte et al. |

(Continued)

FOREIGN PATENT DOCUMENTS

| | | |
|---|---|---|
| CA | 2330159 A1 | 12/1999 |
| DE | 2608063 C2 | 1/1983 |

(Continued)

OTHER PUBLICATIONS

European Application No. 16175563.2: Extended European Search Report dated Dec. 9, 2016, 8 pages.

(Continued)

*Primary Examiner* — Yogendra N Gupta
*Assistant Examiner* — Joseph S Leyson
(74) *Attorney, Agent, or Firm* — Baker & Hostetler LLP

(57) ABSTRACT

A multi-manifold extrusion die having a fully independent internal deckle system. The die can selectively produce a composite extrudate having a full-width arrangement, an encapsulation arrangement, or a naked-edge arrangement. Methods are also provided for producing a composite extrudate having a full-width arrangement, an encapsulation arrangement, or a naked-edge arrangement.

9 Claims, 15 Drawing Sheets

(56) References Cited

U.S. PATENT DOCUMENTS

| | | |
|---|---|---|
| 3,797,987 A | 3/1974 | Marion |
| 3,829,274 A | 8/1974 | Melead |
| 3,840,318 A | 10/1974 | Solop |
| 3,870,454 A | 3/1975 | Penrod |
| 3,877,857 A * | 4/1975 | Melead ................ B29C 47/065 425/133.5 |
| 4,008,036 A | 2/1977 | Verlinden et al. |
| 4,057,385 A | 11/1977 | Yazaki et al. |
| 4,248,579 A | 2/1981 | Maejima |
| 4,454,084 A | 6/1984 | Smith et al. |
| 4,659,302 A | 4/1987 | Maejima |
| 4,863,361 A | 9/1989 | Boos |
| 4,890,996 A | 1/1990 | Shimizu |
| 5,395,231 A | 3/1995 | Maejima |
| 5,451,357 A | 9/1995 | Cloeren |
| 5,456,869 A | 10/1995 | Miles et al. |
| 5,484,274 A | 1/1996 | Neu |
| 5,505,609 A | 4/1996 | Cloeren et al. |
| 5,511,962 A | 4/1996 | Lippert |
| 5,582,850 A | 12/1996 | Cloeren et al. |
| 5,679,387 A | 10/1997 | Cloeren et al. |
| 6,017,207 A | 1/2000 | Druschel |
| 6,106,268 A | 8/2000 | Figa et al. |
| 6,186,765 B1 | 2/2001 | Ide et al. |
| 6,287,105 B1 | 9/2001 | Druschel |
| 7,104,778 B2 | 9/2006 | Bomba |
| 2004/0056373 A1 | 3/2004 | Ulcej et al. |
| 2008/0057148 A1 | 3/2008 | Pitch et al. |
| 2008/0163502 A1 | 7/2008 | Siraky |
| 2009/0194901 A1 | 8/2009 | Nakamura |
| 2011/0206795 A1 | 8/2011 | Ulcej et al. |
| 2013/0122131 A1 | 5/2013 | Sedivy |

FOREIGN PATENT DOCUMENTS

| | | |
|---|---|---|
| DE | 102011002313 A1 | 4/2012 |
| EP | 0315304 A1 | 5/1989 |
| EP | 0642912 A1 | 3/1995 |
| FR | 2409144 A1 | 6/1979 |
| FR | 2516437 A1 | 5/1983 |
| GB | 2009972 A | 6/1979 |
| JP | 54097663 A | 8/1979 |
| JP | 55-028825 A | 2/1980 |
| JP | S55-028825 A | 2/1980 |
| JP | 08142158 A | 6/1996 |
| JP | H08207115 A | 8/1996 |
| JP | 11-333906 A | 12/1999 |
| JP | H11-333906 A | 12/1999 |
| JP | 2002192594 A | 7/2002 |
| JP | 2010214966 | 9/2010 |
| JP | 2012183691 A | 9/2012 |
| WO | 9961218 A1 | 12/1999 |

OTHER PUBLICATIONS

European Patent Application No. EP 15 16 9216, Extended European Search Report dated Oct. 22, 2015, 8 pages.

Engineering drawing of External Deckle sold by Extrusion Dies Ind. LLC, Drawing No. 4DP37792.DEC, Apr. 12, 2007, 1 page.

European Application No. 15 169 216.7: Office Action dated Jul. 29, 2016, 5 pages.

\* cited by examiner

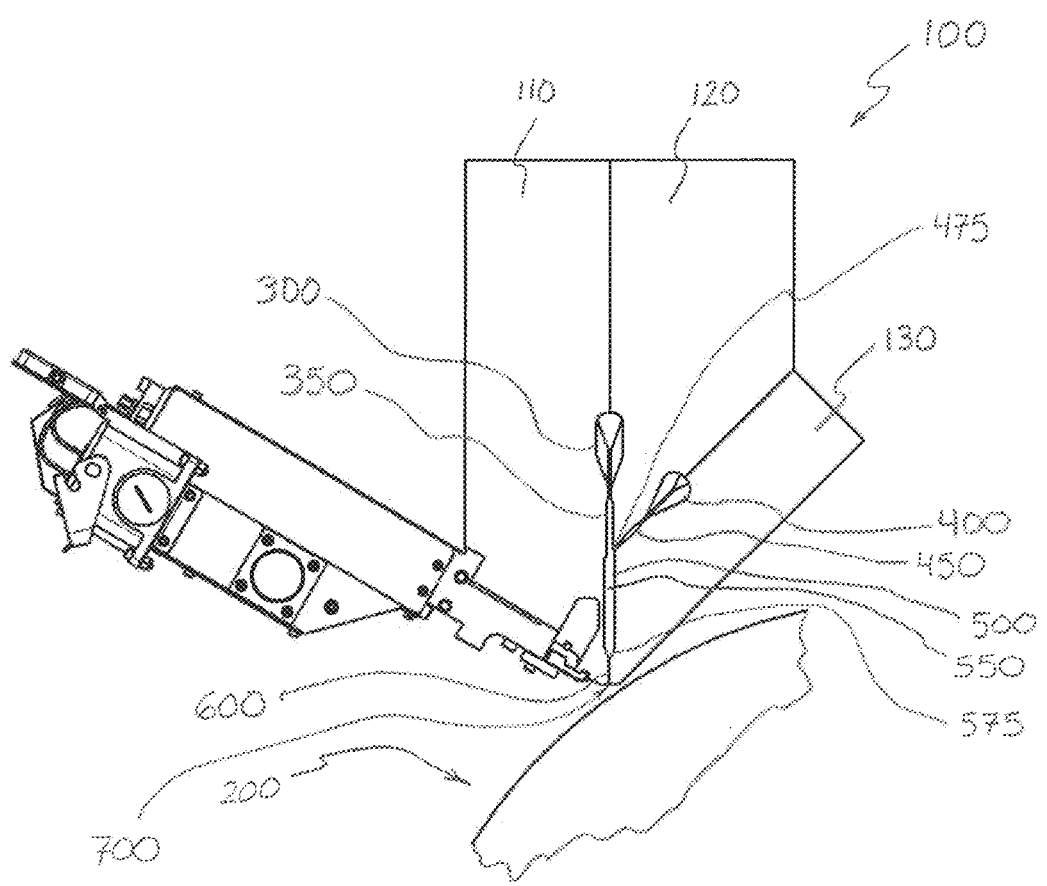

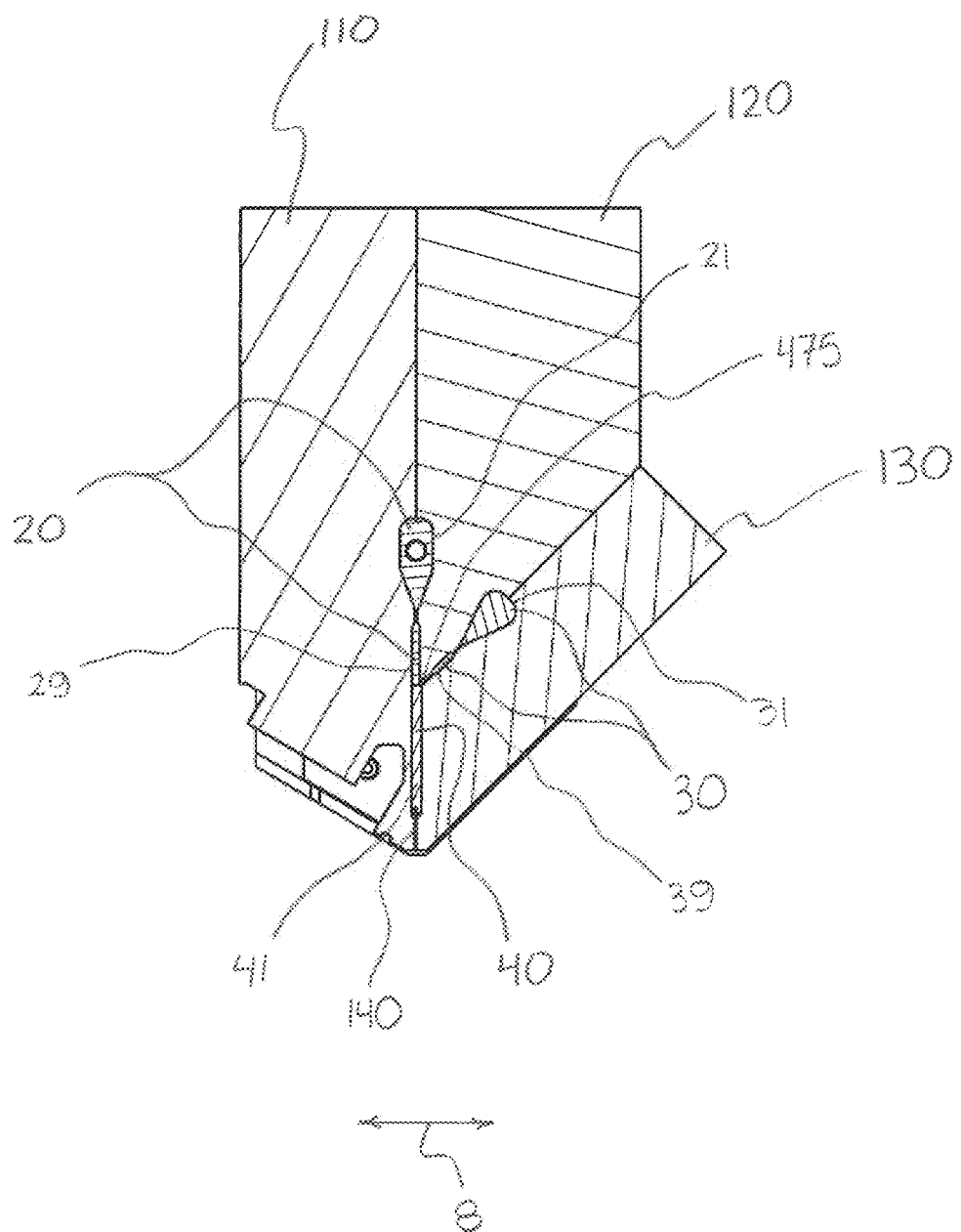

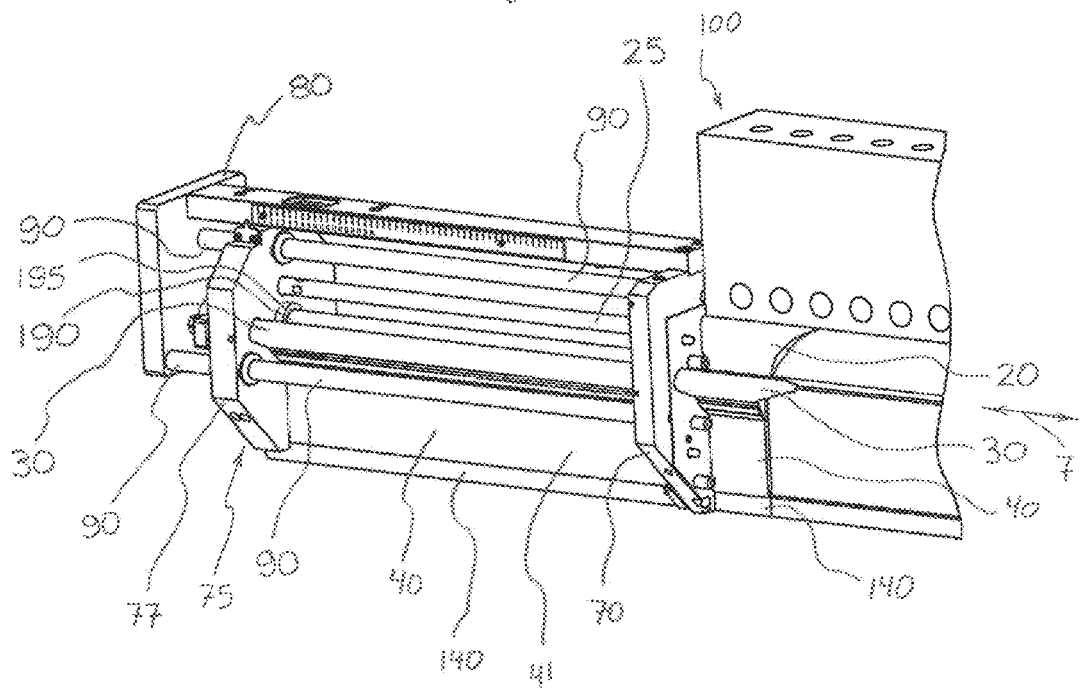

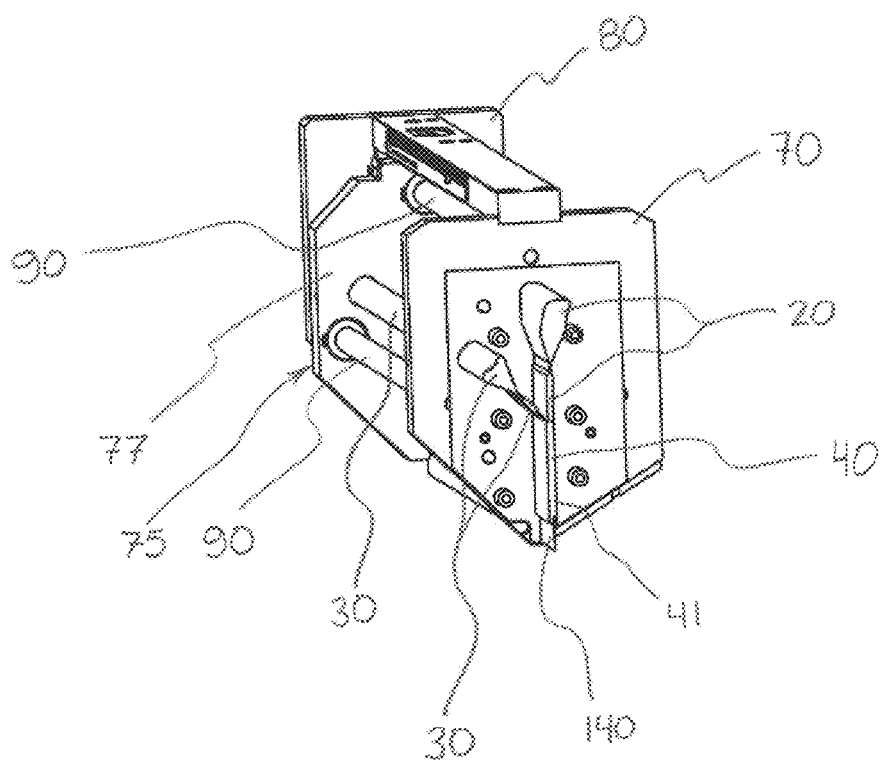

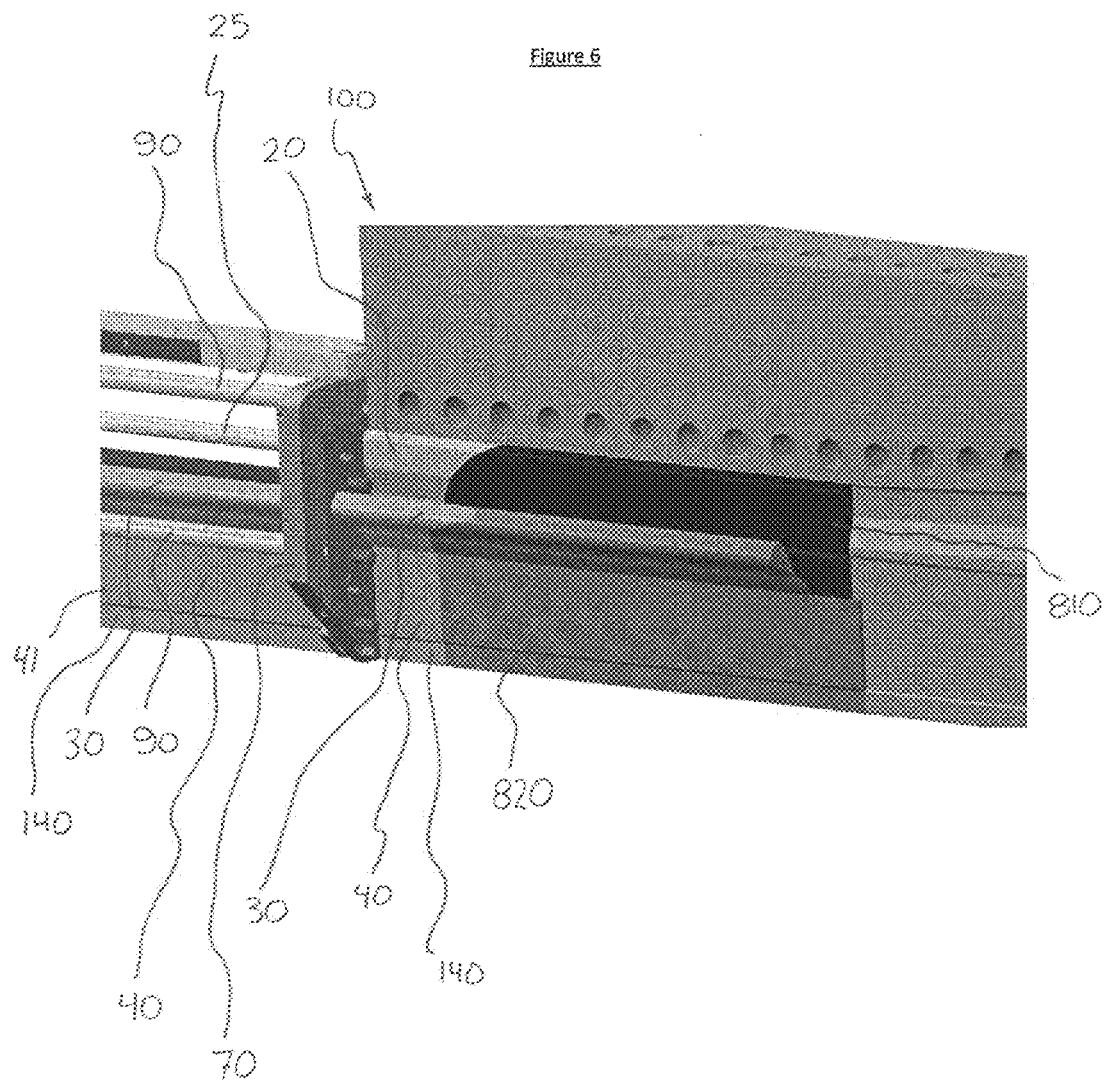

MULTI-MANIFOLD EXTRUSION DIE WITH DECKLE SYSTEM AND METHOD OF USING SAME

TECHNICAL FIELD

This invention relates to an extrusion die with a deckle system and, more particularly, to a deckle system for a multi-manifold extrusion die.

BACKGROUND

An extrusion die for extruding thin films has an outlet orifice that extends along the length of the die. In operation, molten polymer flows under pressure through one or more internal flow passages in the die and leaves the die via the outlet orifice. To control the width of the thin film produced by the extrusion die, the die can be provided with a deckle system. When provided, the deckle system is inserted into the internal flow passage(s) of the die to prevent extrudate from flowing through the areas occupied by the deckle system. In this manner, the deckle system adjusts the outlet orifice width through which molten polymer can flow and, accordingly, sets the width of the extruded film produced using the die.

Deckle systems can have a variety of configurations. The deckles on an extrusion die may be internal to the die, external to the die, or both (i.e., internal and external deckles can both be provided). Internal deckle systems include one or more internal deckle members, such as full-width flags, plugs, and deckle rods. The different internal deckle components fill the end regions of respective sections of the internal flow passage(s).

A problem with existing extrusion technology is the lack of an extrusion die that can selectively produce a composite extrudate having an encapsulation arrangement, a full-width arrangement, or a naked-edge arrangement. It would be desirable to provide an extrusion die capable of such varied production and having multiple manifolds equipped with respective internal deckles that are independently adjustable by virtue of a precise, compact, easy-to-use deckle adjustment system. It would be particularly desirable to provide a method of using such an extrusion die to produce a composite extrudate having a full-width arrangement, an encapsulation arrangement, or a naked-edge arrangement.

It would also be desirable to provide methods of using an extrusion die having first and second manifolds and first and second internal deckle members received respectfully in the first and second manifolds, where one of the first and second internal deckle members is moved further into the extrusion die than the other, and where the method produces a composite extrudate having either an encapsulated arrangement or a naked-edge arrangement.

SUMMARY

In general, this disclosure relates to a multi-manifold extrusion die with an internal deckle system to simultaneously control both the width of a composite extrudate discharging from the die and the particular multi-layer arrangement of the composite extrudate.

In one embodiment, the invention provides an extrusion die having first and second manifolds, converging first and second internal flow passageways extending respectively from the first and second manifolds, a downstream flow channel extending from a convergence of the first and second internal flow passageways, an outlet orifice, and an internal deckle system. The internal deckle system has an encapsulation position, a full-width position, and a naked-edge position. The internal deckle system when in the encapsulation position configures the extrusion die to produce an encapsulated composite extrudate comprising a core layer and a skin layer of greater width than the core layer, such that the skin layer defines lateral edges of the composite extrudate. The internal deckle system when in the full-width position configures the extrusion die to produce a full width composite extrudate comprising a core layer and a skin layer both extending over a full width of the composite extrudate. The internal deckle system when in the naked-edge position configures the extrusion die to produce a naked edge composite extrudate comprising a skin layer and a core layer of greater width than the skin layer, such that the core layer defines lateral edges of the composite extrudate.

In another embodiment, the invention provides a method of using an extrusion die having first and second manifolds and an internal deckle system comprising first and second internal deckle members received respectfully in the first and second manifolds. The method involves positioning one of the first and second internal deckle members further into the extrusion die than the other, and operating the extrusion die to produce a composite extrudate having either: i) an encapsulated arrangement comprising a core layer and a skin layer of greater width than the core layer such that the skin layer defines lateral edges of the composite extrudate, or ii) a naked-edge arrangement comprising a skin layer and a core layer of greater width than the skin layer such that the core layer defines lateral edges of the composite extrudate.

BRIEF DESCRIPTION OF THE DRAWINGS

The following drawings are illustrative of particular embodiments of the invention and therefore do not limit the scope of the invention. The drawings are not necessarily to scale and are intended for use in conjunction with the explanations provided in the following detailed description. Embodiments of the invention will hereinafter be described in connection with the appended drawings, wherein like numerals denote like elements.

FIG. 1 is a schematic side view of an extrusion die having two manifolds in accordance with one embodiment of the invention.

FIG. 2 is a cross-sectional side view of the extrusion die of FIG. 1, with the cross section taken through internal deckle members of the die's internal deckle system.

FIG. 3 is a perspective view of the extrusion die of FIG. 1, with the internal deckle system shown in a full-width position.

FIG. 4 is a perspective view of the deckle system of FIG. 3, with the internal deckle system shown again in a full-width position.

FIG. 5 is another perspective view of the deckle system of FIG. 3, with the internal deckle system shown once again in a full-width position.

FIG. 6 is a perspective view of the extrusion die of FIG. 3, with the internal deckle system shown yet again in a full-width position while two extrudate flows move through the die.

DETAILED DESCRIPTION

Figure 7:
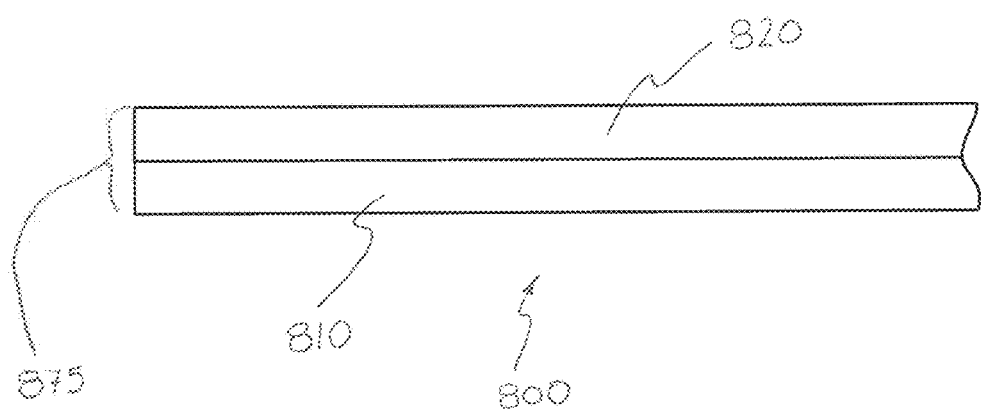
FIG. 7 is a cross-sectional view of a full-width composite extrudate produced by the extrusion die of FIG. 3.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

In the present extrusion systems and processes, an extrusion die is typically positioned downstream of one or more extruders, a feedblock, and/or one or more other upstream extrusion tools (e.g., a layer multiplier). In operation, such extruder(s), feedblock, or other upstream tool supply the die with at least one flow of polymeric material or another extrudate. The extrusion die is configured so the molten polymer or other extrudate flows through the die from an inlet manifold to an outlet orifice, in the process forming the extrudate into a desired shape (e.g., a flat, sheet-like shape).

The present invention provides an extrusion die 100 having multiple manifolds 300, 400. In the embodiment of FIG. 1, the die 100 has two manifolds, including a first (or "primary") manifold 300 and a second (or "secondary") manifold 400. In other embodiments, the extrusion die can have three or more manifolds, depending upon the particular applications for which the die is intended.

Preferably, the die 100 includes two manifolds 300, 400 located at transversely spaced apart positions of the die. This is best appreciated in FIGS. 1 and 2. Each of these laterally spaced-apart manifolds 300, 400 is elongated transversely and preferably spans the entire transverse length of the die 100. In FIGS. 1 and 2, these two manifolds 300, 400 extend along transverse axes that are parallel to each other. The arrangement and orientation of the die's manifolds, however, can be varied to accommodate different applications. The terms "lateral," "laterally," and the like refer to the directions/axis of arrow 8 (see FIG. 2). The terms "transverse," "transversely," and the like refer to the directions/axis of arrow 7 (see FIG. 3).

In FIG. 1, the first manifold 300 is centered on the same axis as the rest of the main flow line, including the outlet orifice 700. The second manifold 400 is centered on a different axis and feeds a second flow line, which converges with and opens into the main flow line. In the embodiment illustrated, the second manifold 400 and the rest of the second flow line is centered on an axis that forms an included acute angle with the axis on which the first manifold 300 and the rest of the main flow line are centered. The main flow line and the second flow line converge and intersect at a convergence 475 where the second flow line opens into the main flow line.

In more detail, the extrusion die of FIG. 1 has first 300 and second 400 manifolds, converging first 350 and second 450 internal flow passageways extending respectively from the first and second manifolds, a downstream flow channel 500 extending from a convergence 475 of the first and second internal flow passageways, and an outlet orifice 700. In the embodiment illustrated, the downstream flow channel 500 comprises a pre-land channel 550, a transition zone 575, and a final land channel 600. The final land channel 600 is narrower than the pre-land channel 550. The transition zone 575 is a region where the interior walls of the downstream flow channel 500 taper from the pre-land channel to the more narrow final land channel. It is to be appreciated, however, that these features are merely exemplary; one or more such features may be omitted or configured differently to accommodate different applications. For example, there need not be separate pre-land and final land channels, and there may be no transition zone. Skilled artisans will appreciate that the flow lines in the die can be provided with many different configurations, e.g., depending upon how the die is intended to be used.

In FIG. 1, the extrusion die 100 comprises first 110 and second 120 blocks coupled together to form therebetween the first flow line (which includes the first manifold 300), while the second block 120 and a third block 130 are coupled together to form therebetween the second flow line (which includes the second manifold 400). As noted above, the extrusion die 100 may have three or more manifolds. Accordingly, the die 100 may have one or more additional blocks to provide the desired number of flow lines. As another alternative, a smaller number of blocks (even an appropriately formed single block) may in some cases delineate the multiple manifolds and flow lines.

The present multiple-manifold die 100 has an advantageous internal deckle system. The internal deckle system comprises at least two internal deckle members 20, 30 received respectfully in the two manifolds 300, 400. These internal deckle members 20, 30 are independently adjustable. Specifically, each of these internal deckle members 20, 30 can be moved transversely relative to the other (and relative to the manifold in which it is received). In addition, the internal deckle members 20, 30 preferably can be moved conjointly in a transverse direction relative to the manifolds 300, 400 in which they are received.

In the illustrated embodiment, the first internal deckle member 20 is a deckle flag for a core layer 810 to be extruded, and the second internal deckle member 30 is a deckle flag for a skin layer 820 to be extruded. The internal deckle members 20, 30 can be provided in various shapes, e.g., depending upon the shape of the manifolds 300, 400 in which they are received. Preferably, each of these internal deckle members 20, 30 comprises a metal bar elongated along a transverse axis and having a cross-sectional shape (in a plane perpendicular to the transverse axis) matching that of the respective manifold 300, 400, such that the internal deckle member substantially entirely plugs the end region of the manifold in which it is received.

As best appreciated by referring to FIGS. 1 and 2, the first internal deckle member 20 is received in both the first manifold 300 and the first internal flow passageway 350, while the second internal deckle member 30 is received in both the second manifold 400 and the second internal flow passageway 450. Referring to FIGS. 2 and 5, the first internal deckle member 20 has an upstream body portion 21 and a downstream tail portion 29. The body portion 21 is received in the first manifold 300, while the tail portion 29 is received the first internal flow passageway 350. Similarly, the second internal deckle member 30 has an upstream body portion 31 and a downstream tail portion 39. The body portion 31 is received in the second manifold 400, while the tail portion 39 is received the second internal flow passageway 450. For each of these two internal deckle members 20, 30, the body portion 21, 31 has a greater thickness than the tail portion 29, 39. In the illustrated embodiment, the body and tail portions of each of these internal deckle members are both formed by a single integral body. If desired, however, the tail portion can alternatively be formed by a separate piece of shim stock or the like, which is joined to a downstream end of the body portion. As another alternative, the integral tail portions may be replaced with separate, independently adjustable, small internal deckle members.

In the embodiment illustrated, the first tail portion 29 of the first internal deckle member 20 has a first downstream tip region, and the second tail portion 39 of the second internal deckle member 30 has a second downstream tip region. As shown in FIGS. 2 and 5, these first and second downstream tip regions are positioned adjacent to each other, and preferably contact each other, at the confluence of the die's first 350 and second 450 internal flow passageways. Such arrangements can advantageously prevent a significant gap from being exposed between the internal deckle members at the confluence of the first 350 and second 450 internal flow passageways.

The internal deckle system preferably also includes a third internal deckle member 40, which is received in the downstream flow passage 500. When provided, the third internal deckle member 40 is movable transversely relative to the flow passage 500 in which it is received. In the embodiment illustrated, the third internal deckle member 40 is a deckle flag for sheet width control. This is perhaps best appreciated by referring to FIGS. 3, 6, 8, 10, 12, and 14.

The third internal deckle member 40 can be provided in various shapes, e.g., depending upon the shape of the flow passage 500 in which it is received. Preferably, the third internal deckle member 40 comprises a metal plate elongated along a transverse axis and having a cross-sectional shape (in a plane perpendicular to the transverse axis) matching that of the downstream flow passage 500, such that this internal deckle member substantially entirely plugs the end region of the flow passage in which it is received.

In the embodiment illustrated, the third internal deckle member 40 has an upstream body portion 41 and a downstream tail portion 140. The body portion 41 is received in the pre-land channel 550, while the tail portion 140 is received the final land channel 600. The body portion 41 has a greater thickness than the tail portion 140. In the illustrated embodiment, the body 41 and tail 140 portions of the third internal deckle member 40 are formed by separate bodies. As shown in FIG. 2, the tail portion 140 is formed by a separate piece of shim stock, which is joined to a downstream end of the body portion. As another alternative, both portions 41, 140 could be machined from a single piece of metal.

As will be appreciated by skilled artisans, the internal deckle members 20, 30, 40 are inserted into respective internal flow passages of the extrusion die 100 (and are sized and shaped to fill or "plug" end regions of those flow passages) so as to prevent extrudate from flowing through the portions of those flow passages occupied by the internal deckle members. In the embodiment illustrated, the second internal deckle member 20 is a full-length deckle, while the first internal deckle member 30 comprises a plug (the portion received in the manifold 300) mounted on the end of a control shaft 25. It is to be understood, however, that both of these internal deckle members 20, 30 can alternatively be full-length deckles, both can be plugs, or the first internal deckle member 20 can be a full-length deckle while the second internal deckle member 30 is a plug.

In the illustrated embodiment, the extrusion die 100 has a deckle control system comprising a movable deckle carrier (or "adjustment arm") 75 to which the internal deckle members 20, 30, 40 are mounted. The deckle carrier 75 is configured for transverse movement relative to (e.g., selectively toward or away from) the die 100 and/or relative to a stationary end plate 70 of the deckle assembly 10. Such transverse movement of the deckle carrier 75 causes the internal deckle members 20, 30, 40 to move together with the deckle carrier in the transverse direction 7. In addition, the first 20 and second 30 internal deckle members are independently moveable relative to the die 100, relative to the deckle carrier 75, and relative to each other.

Thus, in the embodiment illustrated, the first 20, second 30, and third 40 internal deckle members are conjointly moveable in a transverse manner together with the deckle carrier 75, e.g., in response to conjoint actuation of the internal deckle control system. In addition, the first 20 and second 30 internal deckle members are independently moveable relative to the die 100, relative to the deckle carrier 75, and relative to each other, e.g., in response to independent actuation of the internal deckle control system. This type of arrangement—where each of the two upstream internal deckle members is independently adjustable relative to the downstream internal deckle member—provides exceptional flexibility in terms of the extrusion die's production capabilities.

The illustrated deckle carrier 75 comprises a carrier plate 77 having a height (measured along the axis on which the illustrated first flow line is centered), a width (measured along a lateral axis 7), and a thickness. In the embodiment illustrated, the first 20 and second 30 internal deckle members are mounted to the deckle carrier 75 at locations spaced apart along the width of the deckle carrier. This is perhaps best seen in FIGS. 3, 4, 8, 9, 12, and 13.

In the embodiment illustrated, the deckle carrier 75 is mounted for transverse movement along a plurality of elongated, transversely extending alignment shafts 90. In this embodiment, the alignment shafts 90 extend between a first end plate 70 (which is mounted to the die 100) and a second end plate 80 (which is distal from the die 100). Preferably, the end plates 70, 80 are fixed members that remain stationary during transverse movement of the deckle carrier 75. The illustrated alignment shafts 90 are parallel to each other and perpendicular to the end plates 70 and 80, although this is not required. The illustrated shafts 90 are cylindrical, although this is not required either. For example, the support beams can have a cross section that is a polygon, an ellipse, or another geometric shape.

In FIG. 4, it can be appreciated that the illustrated deckle carrier 75 is movable transversely by operating an actuator 72, which is shown as a rotatable hex cap. By rotating this actuator 72, an exteriorly threaded drive shaft 190 (see FIG. 3) is made to rotate relative to a corresponding interiorly threaded fixed bushing 195 on the deckle carrier 75. This causes the deckle carrier 75 to move transversely along the support beams 90, either toward or away from the die 100, depending upon the direction (i.e., clockwise or counter-clockwise) in which the controller 72 is rotated. In the illustrated embodiment, the controller 72 can be rotated manually, e.g., using an appropriate hand or power tool. As an alternative, the deckle carrier can be moved transversely by any conventional hydraulic or mechanical drive system. In some embodiments, the drive system comprises a conventional gear box, a conventional motor, or both.

In the illustrated embodiment, the drive shaft 190 for the deckle carrier 75 is located at a transverse position between the transverse positions of the first and second internal deckle members 20, 30. The drive shaft 190, however, can be provided at different locations.

With continued reference FIG. 4, it can be appreciated that the first internal deckle member 20 can be moved transversely relative to the deckle carrier 75 by rotating an actuator 22, which is shown as a rotatable hex cap. By rotating this actuator 22, an interiorly threaded portion of the actuator acts on an exteriorly threaded neck 24 of the control shaft 25 (see FIGS. 12 and 13), thereby forcing the control shaft, as well as the first internal deckle member 20, to move transversely, either toward or away from the die 100, depending upon the direction (i.e., clockwise or counter-clockwise) in which the controller 22 is rotated. The structure of actuator 22, however, can take different forms. For example, the exteriorly threaded neck 24 could alternatively be integral to, or rigidly joined to, actuator 22 and a die-side end region of such exteriorly threaded neck 24 could be received rotatably in an interiorly threaded portion of the control shaft 25. In such cases, rotation of the actuator 22 would cause the exteriorly threaded neck 24 to rotate relative to the interiorly threaded portion of the control shaft 25, thereby forcing the control shaft, as well as the first internal deckle member 20, to move axially relative to the die.

Actuation of the second internal deckle member 30 proceeds in a similar manner. The second internal deckle member 30 can be moved transversely relative to the deckle carrier 75 by rotating an actuator 32, which is shown as a rotatable hex cap. By rotating this actuator 32, an exteriorly threaded shaft (not shown) that is integral to, or rigidly joined to, the actuator 32 is made to rotate relative to an interiorly threaded portion of the second internal deckle member 30. This forces the second internal deckle member 30 to move transversely, either toward or away from the die 100, depending upon the direction in which the controller 32 is rotated. As with actuator 22, the structure of actuator 32 can take different forms. For example, the actuator 32 can alternatively be provided with an interiorly threaded portion that acts on an exteriorly threaded shaft projecting from the second internal deckle member 30. In such cases, rotation of the actuator 32 would cause its interior threads to rotate relative to the exterior threads of the shaft projecting from the second internal deckle member 30, thereby forcing the exteriorly threaded shaft, as well as the second internal deckle member 30, to move axially relative to the die.

In the illustrated embodiment, the actuators 22, 32 can be rotated manually, e.g., using an appropriate hand or power tool. As an alternative, these actuators 22, 32 can be equipped for automated rotation. Moreover, the threaded shaft type actuators of the illustrated embodiment can be replaced with any other actuator suitable for independently moving the internal deckle members 20, 30 transversely in a controlled, precise manner. For example, a rack and pinion type actuator can be used.

In the embodiment illustrated, a second stationary end plate 80 is spaced apart from the first stationary end plate 70. The first end plate 70, second end plate 80, and carrier plate 75 each have a die side face and a distal side face. The die side face is the one that faces toward the die; the distal side face is the opposite face, which faces away from the die. As noted above, the deckle control system comprises first 22 and second 32 deckle actuators operably connected respectively to the first 20 and second 30 internal deckle members. As shown in FIG. 4, the first 22 and second 32 deckle actuators are located on the distal side face of the carrier plate 75, e.g., between the carrier plate and the second end plate 80. As noted above, the deckle control system also includes a carrier actuator 72 operably connected to the carrier plate 75. In the embodiment illustrated, the carrier actuator 72 is located on the distal side face of the second end plate 80.

The internal deckle system preferably comprises first, second, and third fastening systems respectfully attaching the first 20, second 30, and third 40 internal deckle members to the carrier plate 75. The first and second fastening systems respectfully attach the first 20 and second 30 internal deckle members to the carrier plate 75 such that each of the first and second internal deckle members can selectively either be retained in a fixed position relative to the carrier plate or moved transversely relative to the carrier plate. In contrast, the third fastening system attaches the third internal deckle member 40 to the carrier plate 75 in a permanently fixed position, such that the third internal deckle member is not movable transversely relative to the carrier plate. In the embodiment illustrated, the first and second fastening systems comprise first and second mounting blocks 26, 36, which respectfully secure the first 20 and second 30 internal deckle members to the carrier plate 75. These mounting blocks 26, 36 cooperate with the above-described deckle actuators 22, 32 to enable each of the first 20 and second 30 internal deckle members to selectively either be retained in a fixed position relative to the carrier plate 75 or moved transversely relative to the carrier plate. In contrast, the third fastening system in the illustrated embodiment comprises a plurality of fasteners 76 that secure the third internal deckle member 40 to the carrier plate. Thus, the third internal deckle member 40 preferably is at all times retained in a fixed position relative to the carrier plate. If desired, the two illustrated fasteners 76 may be received in two respective holes formed in the third internal deckle member 40. To the extent these holes are larger than the fasteners 76, a certain amount of play of the fasteners may be provided within the holes.

The internal deckle system has a full-width position, an encapsulation position, and a naked-edge position. The internal deckle system when in the full-width position configures the extrusion die 100 to produce a full width composite extrudate, which comprises a core layer 810 and a skin layer 820 both extending over a full width of the composite extrudate 800. A full width composite extrudate is shown in FIG. 7. It can be appreciated that each lateral edge 875 of this composite extrudate is formed collectively by both the core layer 810 and the skin layer 820. When the illustrated deckle system is in the full-width position, the first 20 and second 30 internal deckle members extend equal or substantially equal distances into the die 100. This is perhaps best seen in FIG. 6.

Figure 11:
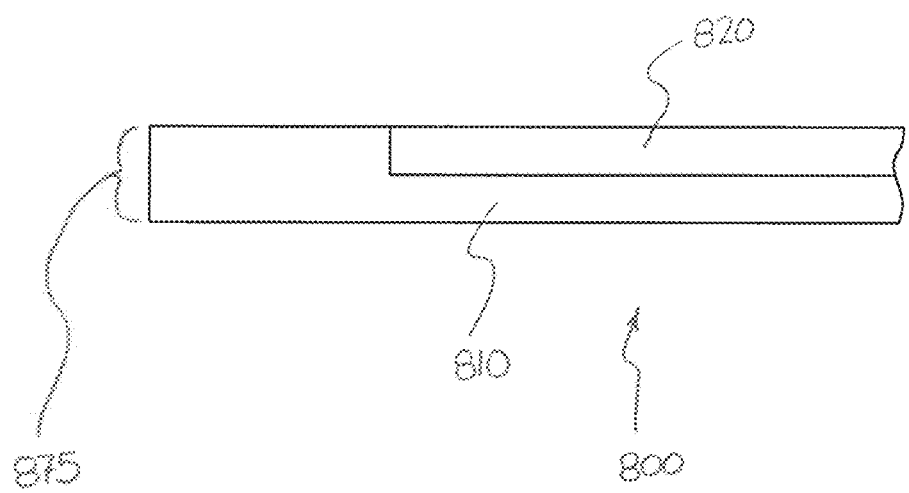
FIG. 11 is a cross-sectional view of a naked-edge composite extrudate produced by the extrusion die of FIG. 8.

The internal deckle system when in the naked-edge position configures the extrusion die 100 to produce a naked edge composite extrudate, which comprises a skin layer 810 and a core layer 820 of greater width than the skin layer, such that the core layer alone defines both lateral edges 875 of the composite extrudate 800. A naked edge composite extrudate is shown in FIG. 11. When the internal deckle system is in said naked-edge position, the second internal deckle member 30 extends a greater distance into the die 100 than does the first internal deckle member 20. This is perhaps best seen in FIG. 8.

The internal deckle system when in the encapsulation position configures the extrusion die 100 to produce an encapsulated composite extrudate, which comprises a core layer 810 and a skin layer 820 of greater width than the core layer, such that the skin layer alone defines both lateral edges 875 of the composite extrudate 800. An encapsulated composite extrudate is shown in FIG. 15. When the internal deckle system is in the encapsulation position, the first internal deckle member 20 extends a greater distance into the die 100 than does the second internal deckle member 30. This is perhaps best seen in FIG. 14.

Thus, the internal deckle system of the present extrusion die 100 provides control over both the sheet width and the edge configuration of the extrudate. Moreover, the configuration of the extrusion die 100 and its internal deckle system provides a precise, compact, and easy-to-use system for producing composite extrudates having any one of three advantageous layer arrangements—specifically, a full-width arrangement, a naked-edge arrangement, or an encapsulated arrangement.

The invention also provides methods of using an extrusion die 100 having first 300 and second 400 manifolds and an internal deckle system comprising first 20 and second 30 internal deckle members received respectfully in the first and second manifolds.

In a first method embodiment, an extrusion die 100 of the nature described above is operated to produce a composite extrudate 800 having a full-width arrangement (described above, and shown in FIG. 7), an encapsulated arrangement (described above, and shown in FIG. 11), or a naked-edge arrangement (described above, and shown in FIG. 15). The method uses a die 100 having first 300 and second 400 manifolds, converging first 350 and second 450 flow passageways, a downstream flow channel 500, an outlet orifice 700, and an internal deckle system. In the present method embodiment, when the internal deckle system is in a full-width position, the die produces a full width composite extrudate; when the internal deckle system is in an encapsulation position, the die produces an encapsulated composite extrudate; and when the internal deckle system is in a naked-edge position, the die produces a naked edge composite extrudate. In this first method embodiment, the extrusion die 100 can have the apparatus features of any optional or preferred design described above.

In a second method embodiment, the method involves positioning one of the first 20 and second 30 internal deckle members further into the extrusion die 100 than the other, and operating the extrusion die 100 to produce a composite extrudate 800 having either an encapsulated arrangement or a naked-edge arrangement. The extrusion die 100 used in the second method embodiment can advantageously be of the nature described above in connection with the first method embodiment. The second method embodiment, however, is not limited to use with such an extrusion die. Instead, the second method embodiment can use other types of extrusions dies that have first and second manifolds with first and second internal deckle members received respectfully in those manifolds.

Figure 8:
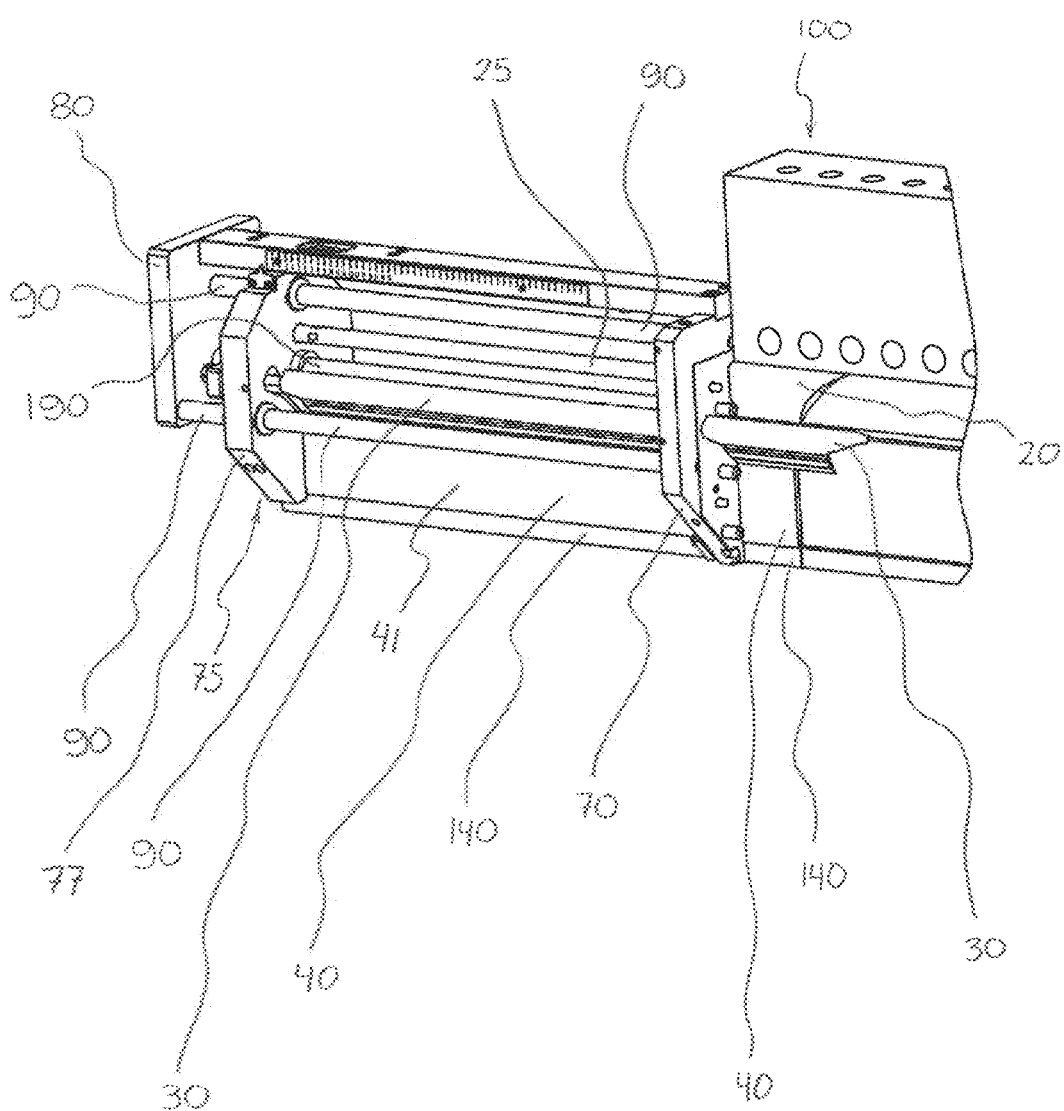
FIG. 8 is a perspective view of the extrusion die of FIG. 1, with the internal deckle system shown in a naked-edge position.
Figure 9:
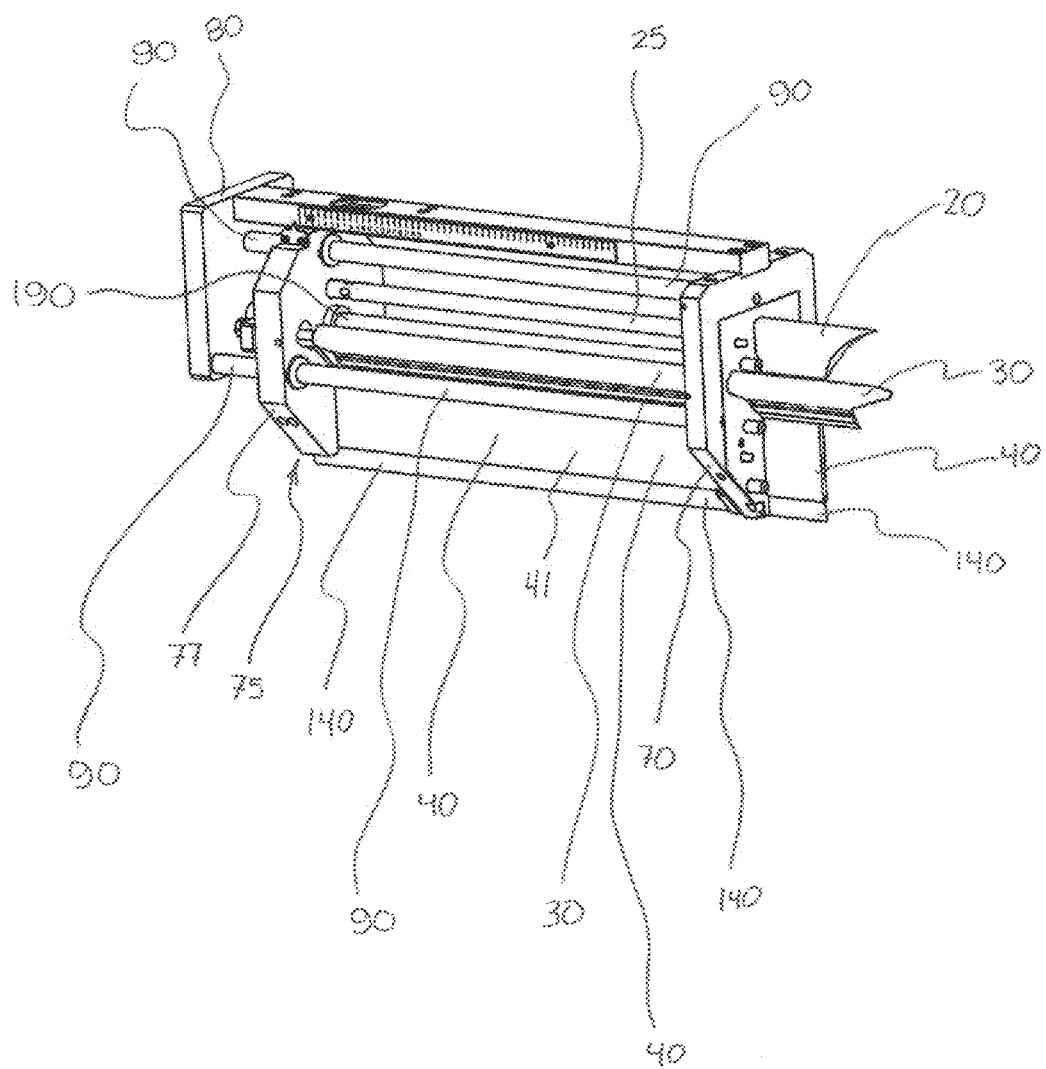
FIG. 9 is a perspective view of the deckle system of FIG. 8, with the internal deckle system shown in a naked-edge position.
Figure 10:
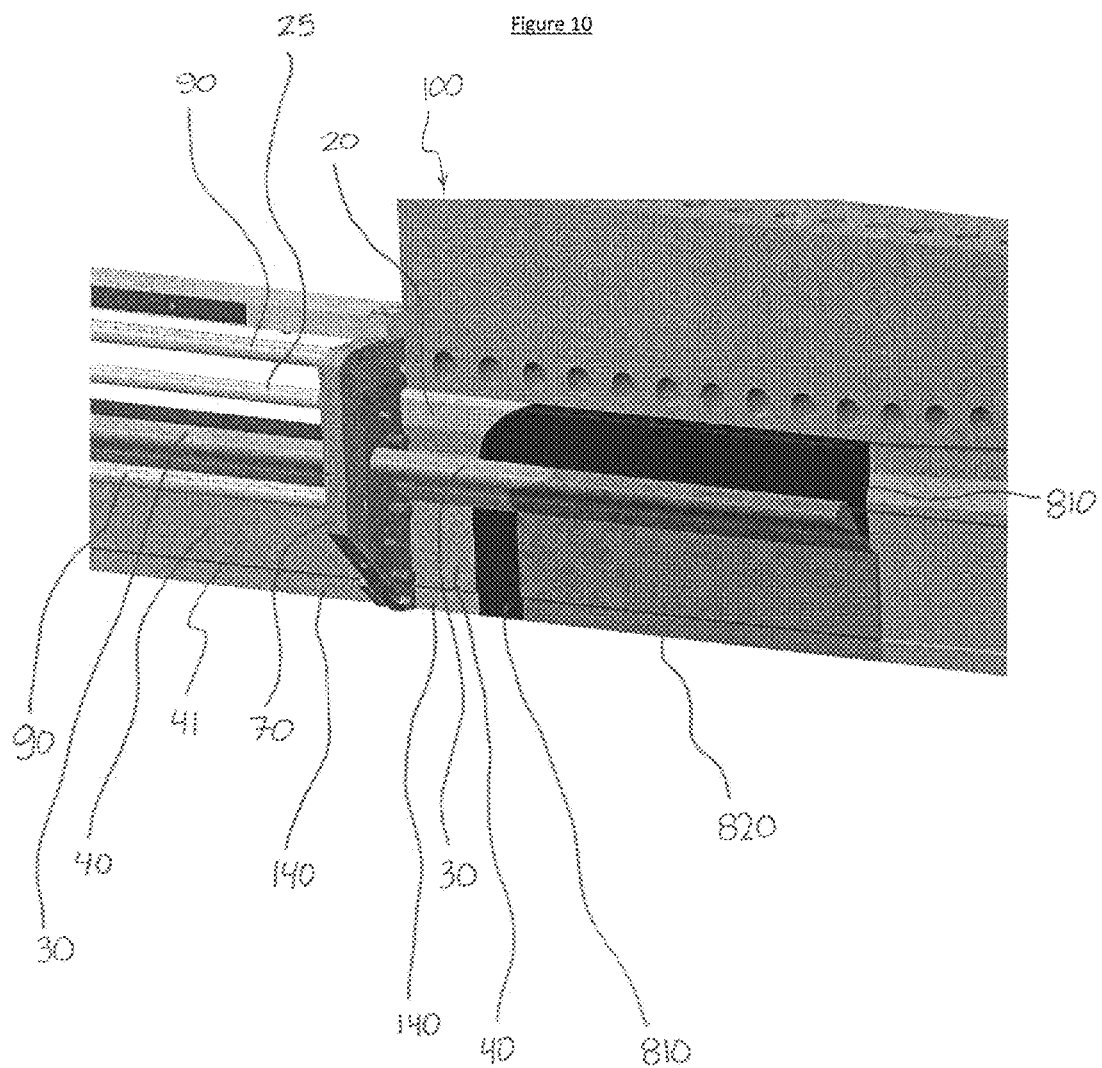
FIG. 10 is a perspective view of the extrusion die of FIG. 8, with the internal deckle system shown once again in a naked-edge position while two extrudate flows move through the extrusion die.

FIGS. 8, 10, 12, and 14 exemplify the manner in which one of the first 20 and second 30 internal deckle members can be positioned further into the extrusion die 100 than the other. In FIGS. 8 and 10, for example, the second internal deckle member 30 projects further into the die 100 than does the first internal deckle member 20. When operated in this position, the extrusion die 100 produces a composite extrudate 800 having a naked-edge arrangement. Thus, in FIG. 10, it can be seen that the core layer material 810 flows along a wider path than the skin layer material 820, due to the first internal deckle member 20 being extended into the die 100 by a lesser distance than the second internal deckle member 30. As a result, the core layer material 810 flows around a lateral edge of the skin layer material 820, thereby surrounding the skin layer material on at least two sides, i.e., on one of its lateral edges and one of its major faces. If both ends of the die are deckled in the same way (i.e., for a naked-edge arrangement), the core layer material 810 flows around both lateral edges of the skin layer material 820, thereby surrounding the skin layer material on at least three sides (i.e., on both of its lateral edges and one of its major faces).

Figure 12:
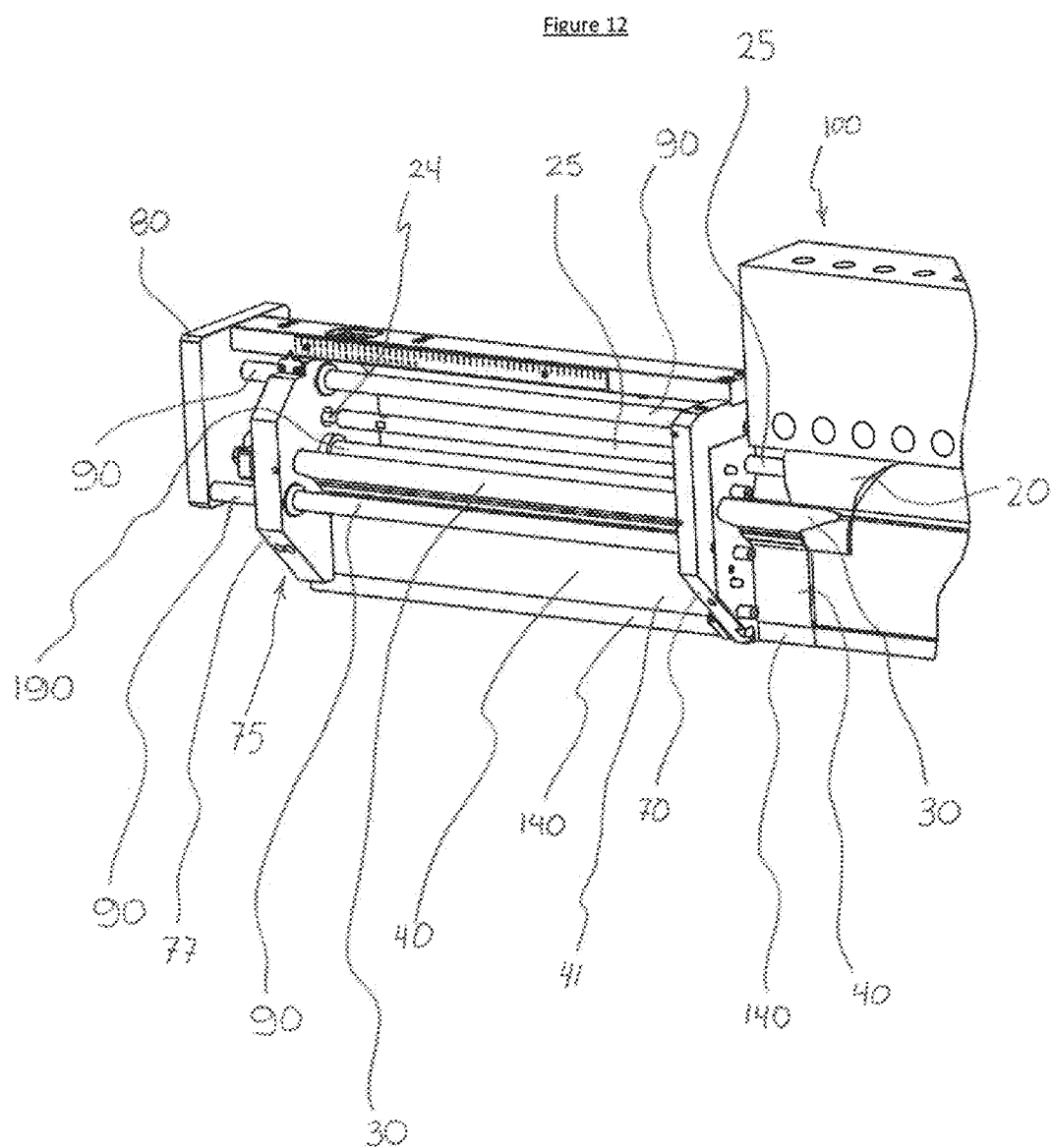
FIG. 12 is a perspective view of the extrusion die of FIG. 1, with the internal deckle system shown in an encapsulation position.
Figure 13:
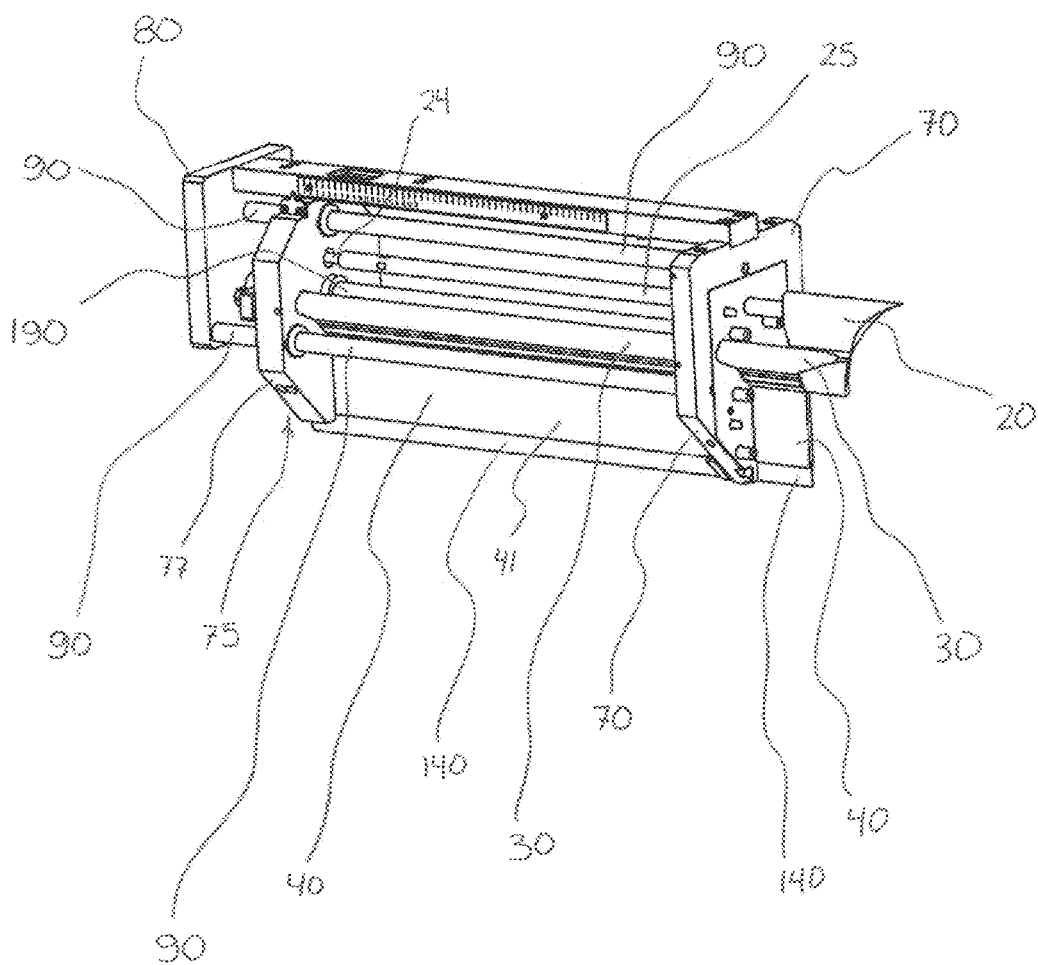
FIG. 13 is a perspective view of the deckle system of FIG. 12, with the internal deckle system shown in an encapsulation position.
Figure 14:
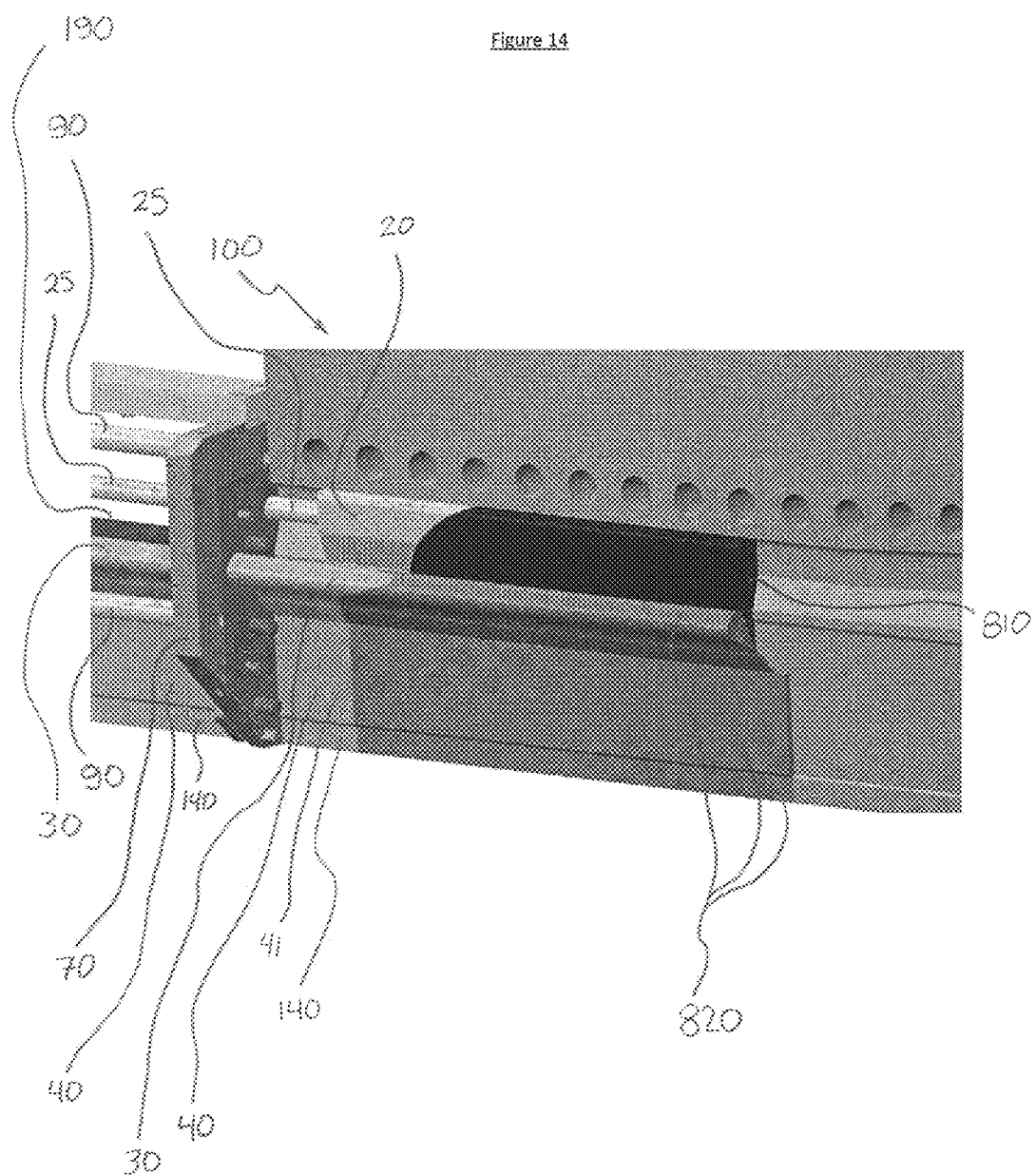
FIG. 14 is a perspective view of the extrusion die of FIG. 12, with the internal deckle system shown once again in an encapsulation position while two extrudate flows move through the extrusion die.
Figure 15:
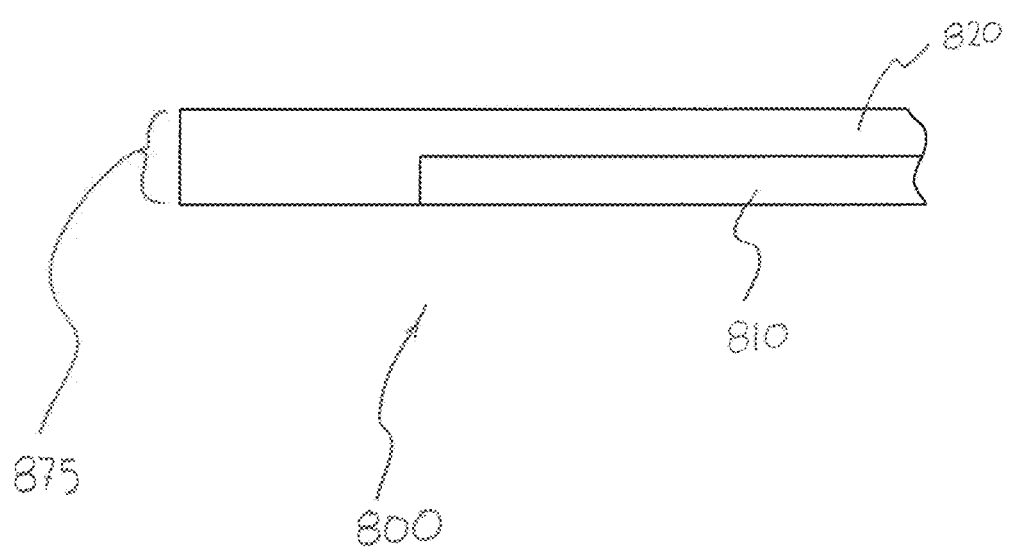
FIG. 15 is a cross-sectional view of an encapsulation composite extrudate produced by the extrusion die of FIG. 12.

In FIGS. 12 and 14, the first internal deckle member 20 projects further into the die 100 than does the second internal deckle member 30. When operated in this position, the extrusion die 100 produces a composite extrudate 800 having an encapsulated arrangement. Thus, in FIG. 14, it can be seen that the skin layer material 820 flows along a wider path than does the core layer material 810, due to the second internal deckle member 30 being extended into the die 100 by a lesser distance than the first internal deckle member 20. As a result, the skin layer material 820 flows around a lateral edge of the core layer material 810, thereby surrounding the core layer material on at least two sides, i.e., on one of its lateral edges and one of its major faces. If both ends of the die are deckled in the same way (i.e., for an encapsulated arrangement), the skin layer material 820 flows around both lateral edges of the core layer material 810, thereby surrounding the core layer material on at least three sides (i.e., on both of its lateral edges and one of its major faces).

Thus, when the extrusion die 100 is operated to produce a composite extrudate 800 with the encapsulated arrangement, the first internal deckle member 20 extends a greater distance into the die than does the second internal deckle member 30, and when the die is operated to produce a composite extrudate with the naked-edge arrangement, the second internal deckle member extends a greater distance into the die than does the first internal deckle member. The extent to which the internal deckle members 20, 30 project into the die, and the extent of the offset between the positions of the leading ends of the two internal deckle members, will vary depending upon the particular process details and composite extrudate configuration desired.

As noted above, in the first method embodiment the extrusion die can be used to produce a composite extrudate having a full-width arrangement. In such cases, the first 20 and second 30 internal deckle members are extended into the extrusion die 100 by substantially the same distance. In FIGS. 3 and 6, for example, the first 20 and second 30 internal deckle member 20 both project the same distance into the die 100. When operated in this position, the die 100 produces a composite extrudate 800 having a full-width arrangement. Thus, in FIG. 7, the core layer material 810 and the skin layer material 820 flow along paths of the same width. As a result, the flows of skin layer material 820 and core layer material 810 have equal widths, i.e., each of these two flows extends across the entire width of the composite extrudate 800. A full width composite extrudate is shown in FIG. 7. As noted above, each lateral edge 875 of this composite extrudate is formed collectively by both the core layer 810 and the skin layer 820.

In either of the first or second method embodiments, the extrusion die 100 can advantageously be operated to produce a composite extrudate 800 having only two layers—the core layer 810 and the skin layer 820. In such cases, when the composite extrudate 800 flows out of the extrusion die 100 through the outlet orifice 700, the extrudate 800 has only the two noted layers 810, 820. However, this is not required. To the contrary, the die can alternatively have three or more manifolds, as noted above.

In the non-limiting examples of FIGS. 7, 11, and 15, the core layer 810 and the skin layer 820 are both exposed layers when the composite extrudate 800 flows out of the die 100 through the outlet orifice 700. This, however, is not always the case. For example, skin layers can be layered onto both sides of the core layer, so as to entirely encapsulate it.

As is perhaps best understood by referring to FIG. 1, in either of the method embodiments, the method may involve flowing core material 810 and skin material 820 respectively from the first 300 and second manifolds 400 and respectively through converging first 350 and second 450 internal flow passageways, and then layering the skin material onto the core material to form the composite extrudate 800, and flowing the composite extrudate through a downstream flow channel 500 and out of the extrusion die 100 through an outlet orifice 700. The extrudate can then be coated onto a substrate, e.g., through any desired "on roll" or "off roll" technique. FIG. 1 schematically depicts an on-roll technique, which involves a roller 200 on which a substrate (not shown) to be coated is moved past the outlet orifice 700 of the die 100.

In the present method embodiments, the preferred extrusion die 100 allows the internal deckle members 20, 30, 40 to be moved together with a deckle carrier 75, and also allows the first 20 and second 30 internal deckle members to be moved independently relative to the deckle carrier (and relative to each other). This enables the operator to first perform a "course" positioning of all the internal deckle members, and thereafter perform a "fine" positioning of just the first 20 and second 30 internal deckle members. Thus, the present method embodiments will in some cases involve moving the first 20 and second 30 internal deckle members conjointly, relative to the extrusion die 100, in a transverse direction together with a deckle carrier 75, followed by independently moving one or both of the first 20 and second 30 internal deckle members transversely relative to the deckle carrier, optionally such that at least one of these deckle members 20, 30 moves transversely relative to the other.

Figure 16:
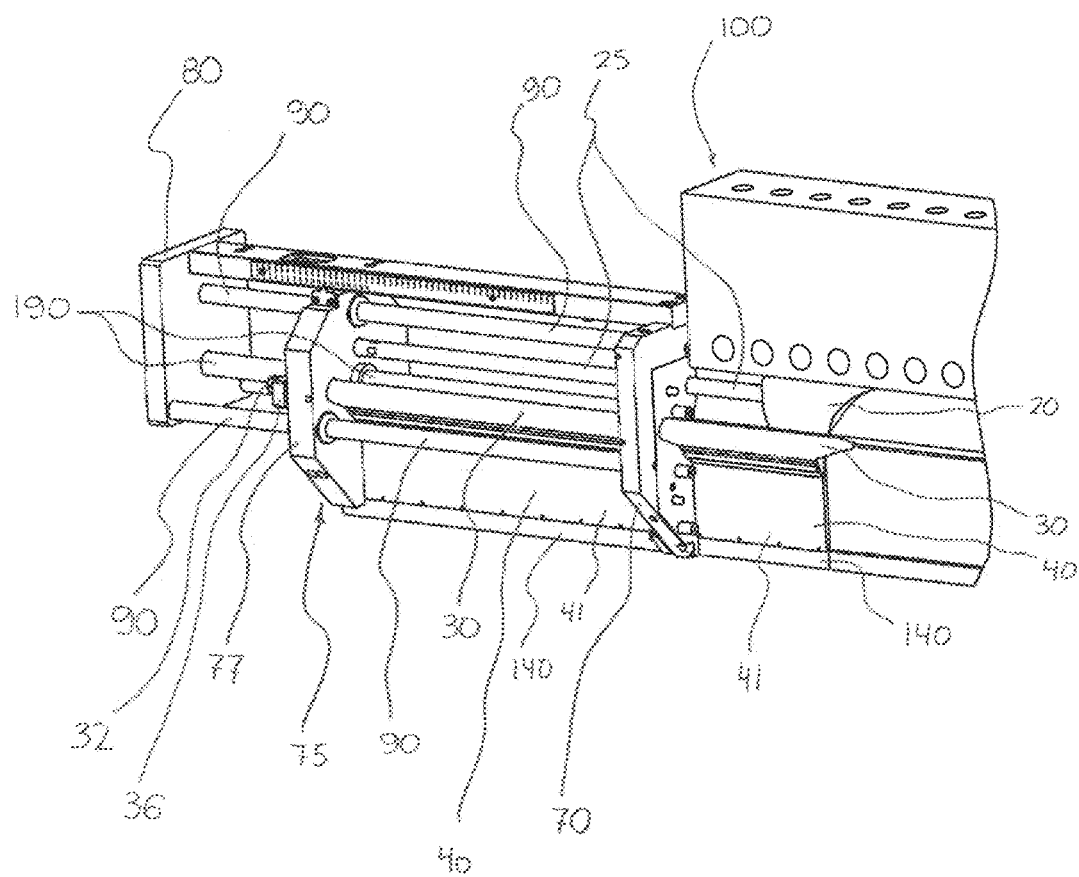
FIG. 16 is a perspective view the extrusion die of FIG. 3, with internal deckle members of the internal deckle system moved further into the die than in FIG. 3.

When the internal deckle members 20, 30, 40 are moved together with a deckle carrier 75, the transverse movement of the deckle carrier is relative to a first stationary end plate 70, which preferably is mounted to the extrusion die 100. This is perhaps best seen by comparing FIG. 3 with FIG. 16. FIG. 16 shows the extrusion system of FIG. 3 but with the internal deckle members 20, 30, 40 moved further into the die 100. As noted above, the movement of the deckle carrier 75 preferably is along a plurality of alignment shafts 90, which extend transversely between stationary first 70 and second 80 end plates.

The methods of the invention can optionally involve: i) operating a carrier actuator 72 located on a distal side face of a second stationary end plate 80, thereby initiating transverse movement of the deckle carrier 75 (which causes conjoint transverse movement of the internal deckle members), and thereafter ii) operating first 22 and/or second 32 deckle actuators located on a distal side face of the deckle carrier, thereby initiating independent transverse movement (i.e., relative to the deckle carrier) of one or both of the first 20 and second 30 internal deckle members. As noted above, the illustrated actuators 22, 32, 72 are rotatable, such that rotation of the carrier actuator 72 initiates transverse movement of the deckle carrier 75, rotation of the first deckle actuator 22 initiates transverse movement of the first internal deckle member 20, and rotation of the second deckle actuator 32 initiates transverse movement of the second internal deckle member 30. The design of the actuators, however, can be varied. For example, they need not be rotatable.

As shown in FIGS. 6, 10, and 14, the leading ends of the internal deckle members 20, 30, 40 have flow surfaces, i.e., surfaces against which extrudate flows during operation of the extrusion die. Thus, the present methods involve flowing extrudate along the leading ends of the internal deckle members. With the illustrated extrusion die, the core material 810 and skin material 820 flow respectfully against the leading ends of the first 20 and second 30 internal deckle members and then converge and flow together against the leading end of the third deckle member 40. Preferably, neither of the first and second internal deckle members 20, 30 have channels or bores formed in them for passage of extrudate therethrough. Thus, the present methods preferably involve flowing extrudate alongside, but not through, the internal deckle members. Further, the internal deckle members preferably are positioned in the extrusion die so that extrudate only flows against the leading end of each internal deckle member, rather than flowing along multiple sides of each internal deckle member.

Various examples have been described. These and other examples are within the scope of the following claims.

What is claimed is:
1. An extrusion die, comprising:
first and second manifolds,
converging first and second internal flow passageways extending respectively from said first and second manifolds,
a downstream flow channel extending from a convergence of said first and second internal flow passageways,
an outlet orifice, and
an internal deckle system comprising a first internal deckle member received in both said first manifold and said first internal flow passageway, a second internal deckle member received in both said second manifold and said second internal flow passageway, and a third internal deckle member received in said downstream flow channel, said internal deckle system having an encapsulation position, a full-width position, and a naked-edge position, wherein:
when in said encapsulation position, said internal deckle system configures said extrusion die to produce an encapsulated composite extrudate comprising a core layer and a skin layer of greater width than the core layer such that the skin layer defines lateral edges of the encapsulated composite extrudate, when in said full-width position, said internal deckle system configures said extrusion die to produce a full width composite extrudate comprising a core layer and a skin layer both extending over a full width of the full width composite extrudate, and when in said naked-edge position, said internal deckle system configures said extrusion die to produce a naked edge composite extrudate comprising a skin layer and a core layer of greater width than the skin layer such that the core layer defines lateral edges of the naked edge composite extrudate.

2. The extrusion die of claim 1, wherein said extrusion die further comprises a deckle control system comprising a movable deckle carrier to which said first, second, and third internal deckle members are mounted, said first, second, and third internal deckle members being conjointly moveable together with said deckle carrier relative to said extrusion die in response to conjoint actuation of said deckle control system, said first and second internal deckle members being independently moveable relative to said extrusion die, relative to said deckle carrier, and relative to each other in response to independent actuation of said deckle control system.

3. The extrusion die of claim 2, wherein:

when said internal deckle system is in said full-width position, said first and second internal deckle members extend substantially equal distances into said extrusion die, when said internal deckle system is in said encapsulation position, said first internal deckle member extends a greater distance into said extrusion die than does said second internal deckle member, and when said internal deckle system is in said naked-edge position, said second internal deckle member extends a greater distance into said extrusion die than does said first internal deckle member.

4. The extrusion die of claim 2, wherein said deckle carrier has a height and a width, said first and second internal deckle members being mounted to said deckle carrier at locations spaced apart along said width of said deckle carrier, said first internal deckle member having a first body portion and a first tail portion, said first body portion received in said first manifold, said first tail portion received in said first internal flow passageway, said second internal deckle member having a second body portion and a second tail portion, said second body portion received in said second manifold, said second tail portion received in said second internal flow passageway, said first body portion having a greater width than said first tail portion, and said second body portion having a greater width than said second tail portion.

5. The extrusion die of claim 4, wherein:

said first tail portion has a first downstream tip region, and said second tail portion has a second downstream tip region, said first and second downstream tip regions contacting each other at said convergence of said first and second internal flow passageways.

6. The extrusion die of claim 2, wherein:

said internal deckle system further comprises a first stationary end plate mounted to said extrusion die, and said deckle carrier further comprises a carrier plate movable transversely relative to said first stationary end plate.

7. The extrusion die of claim 6, wherein said internal deckle system further comprises a second stationary end plate spaced apart from said first stationary end plate, said first stationary end plate, said second stationary end plate, and said carrier plate each have a die side face and a distal side face, said deckle control system further comprising first and second deckle actuators operably connected respectively to said first and second internal deckle members, said first and second deckle actuators located on said distal side face of said carrier plate, and said deckle control system further comprising a carrier actuator operably connected to said carrier plate and located on said distal side face of said second stationary end plate.

8. The extrusion die of claim 6, wherein said internal deckle system further comprises a second stationary end plate and a plurality of alignment shafts, said second stationary end plate spaced apart from said first stationary end plate, said alignment shafts extending transversely between said first and second stationary end plates, said carrier plate located between said first and second stationary end plates and movable along said alignment shafts.

9. The extrusion die of claim 6, wherein said internal deckle system further comprises first, second, and third fastening systems respectfully attaching said first, second, and third internal deckle members to said carrier plate such that each of said first and second internal deckle members can selectively either be retained in a fixed position relative to said carrier plate or moved transversely relative to said carrier plate, said third fastening system attaching said third internal deckle member to said carrier plate in a fixed position such that said third internal deckle member is not movable transversely relative to said carrier plate.

* * * * *